US009953766B2

(12) United States Patent
Shin et al.

(10) Patent No.: US 9,953,766 B2
(45) Date of Patent: Apr. 24, 2018

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-do (KR)

(72) Inventors: Hong Tack Shin, Suwon-Si (KR); Jae Yeol Choi, Suwon-Si (KR); Ji Hea Kim, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 44 days.

(21) Appl. No.: 15/009,784

(22) Filed: Jan. 28, 2016

(65) Prior Publication Data

US 2016/0268047 A1    Sep. 15, 2016

(30) Foreign Application Priority Data

Mar. 9, 2015    (KR) .......................... 10-2015-0032291

(51) Int. Cl.
*H01G 4/30*    (2006.01)
*H01G 4/248*   (2006.01)
(Continued)

(52) U.S. Cl.
CPC ................. *H01G 4/30* (2013.01); *H01G 4/12* (2013.01); *H01G 4/232* (2013.01); *H01G 4/2325* (2013.01)

(58) Field of Classification Search
CPC .......... H01G 4/30; H01G 4/232; H01G 4/248; H01G 4/12; H01G 4/012
(Continued)

(56) References Cited

U.S. PATENT DOCUMENTS

2007/0297119 A1* 12/2007 Maegawa ............... H01G 4/232
                                                        361/306.3
2008/0158773 A1*  7/2008 Lee ........................ H01G 4/005
                                                        361/306.3
(Continued)

FOREIGN PATENT DOCUMENTS

JP          S55-4523 U      1/1980
KR     10-2013-0053878 A    5/2013
(Continued)

OTHER PUBLICATIONS

Korean Notice of Office Action dated Mar. 4, 2016 issued in Korean Patent Application No. 10-2015-0032291 (English translation).

*Primary Examiner* — Eric Thomas
*Assistant Examiner* — Arun Ramaswamy
(74) *Attorney, Agent, or Firm* — McDermott Will & Emery LLP

(57) ABSTRACT

A multilayer ceramic electronic component includes a ceramic body including an electrode structure including internal electrodes stacked to face each other with respective dielectric layers interposed therebetween and alternately exposed to first and second end surfaces thereof and ceramic bands enclosing regions spaced apart from the first and second end surfaces of the electrode structure; and external electrodes covering the first and second end surfaces of the electrode structure and at least portions of surfaces of the electrode structure connected to the first and second end surfaces of the electrode structure, respectively.

15 Claims, 2 Drawing Sheets

(51) Int. Cl.
   *H01G 4/06*     (2006.01)
   *H01G 4/228*    (2006.01)
   *H01G 4/12*     (2006.01)
   *H01G 4/232*    (2006.01)

(58) Field of Classification Search
   USPC ............ 361/301.4, 321.1, 321.2, 310, 306.1
   See application file for complete search history.

(56) References Cited

U.S. PATENT DOCUMENTS

2009/0207554 A1* 8/2009 Iguchi .................... H01G 2/24
                                                     361/321.2
2013/0120900 A1   5/2013 Chung et al.

FOREIGN PATENT DOCUMENTS

KR   10-2013-0056569 A   5/2013
KR      2013-0061260 A   6/2013

* cited by examiner

MULTILAYER CERAMIC ELECTRONIC COMPONENT AND METHOD OF MANUFACTURING THE SAME

CROSS-REFERENCE TO RELATED APPLICATION

This application claims the benefit of priority to Korean Patent Application No. 10-2015-0032291, filed on Mar. 9, 2015 with the Korean Intellectual Property Office, the entirety of which is incorporated herein by reference.

TECHNICAL FIELD

The present disclosure relates to a multilayer ceramic electronic component and a method of manufacturing the same, and more particularly, to a multilayer ceramic electronic component having improved mounting reliability, and a method of manufacturing the same.

BACKGROUND

Recently, the drive towards further miniaturization and thinness of information technology (IT) devices such as various communications devices, display devices, or the like, has been accelerated. Therefore, research has been continuously conducted into technology allowing for the miniaturization and thinning of electronic components that are used in such IT devices, such as transformers, inductors, capacitors, transistors, and the like, and increasing the capacity of these various electronic components as well.

In particular, the miniaturization and thinning of a multilayer ceramic capacitor (MLCC) and an increase in capacitance of the MLCC have been demanded. In the development of a multilayer ceramic capacitor having a high degree of capacitance, high reliability should be secured depending on the application of a voltage together with whether or not capacitance is implemented.

SUMMARY

An exemplary embodiment in the present disclosure provides a multilayer ceramic electronic component of which capacitance may be increased and mounting reliability may be improved.

An exemplary embodiment in the present disclosure also provides a method of manufacturing a multilayer ceramic electronic component of which capacitance may be increased and mounting reliability may be improved.

According to an exemplary embodiment in the present disclosure, a multilayer ceramic electronic component includes: a ceramic body including an electrode structure including internal electrodes stacked to face each other with respective dielectric layers interposed therebetween and alternately exposed to first and second end surfaces thereof and ceramic bands enclosing regions spaced apart from the first and second end surfaces of the electrode structure; and external electrodes covering the first and second end surfaces of the electrode structure and at least portions of surfaces of the electrode structure connected to the first and second end surfaces of the electrode structure, respectively.

The external electrodes may have a thickness less than that of the ceramic body in the thickness direction.

The external electrodes may have a width narrower than that of the ceramic body in the width direction.

The external electrodes may cover an entirety of the surfaces of the electrode structure connected to the first and second end surfaces of the electrode structure.

The multilayer capacitor may satisfy C<D, where C is a length of the extent of the external electrode along an upper surface of the electrode structure and D is a distance between the end surface of the electrode structure and the ceramic band.

According to another exemplary embodiment in the present disclosure, a method of manufacturing a multilayer ceramic electronic component comprises steps of: preparing a ceramic body including an electrode structure including internal electrodes stacked to face each other with respective dielectric layers interposed therebetween and alternately exposed to first and second end surfaces thereof and ceramic bands enclosing regions spaced apart from the first and second end surfaces of the electrode structure; and forming external electrodes covering the first and second end surfaces of the electrode structure and at least portions of surfaces of the electrode structure connected to the first and second end surfaces of the electrode structure, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
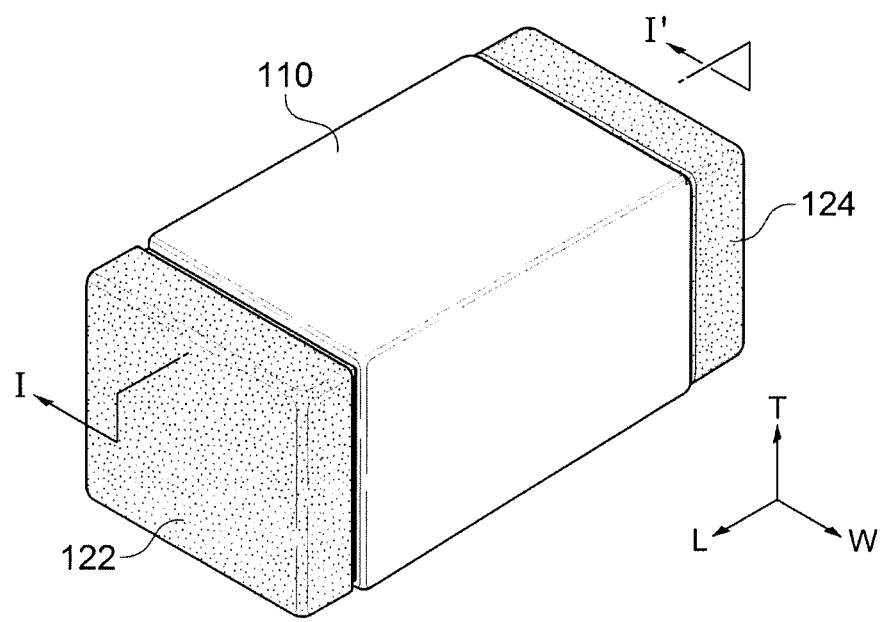
FIG. 1 is a schematic perspective view illustrating a multilayer ceramic electronic component according to an exemplary embodiment in the present disclosure.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "upper," or "above" other elements would then be oriented "lower," or "below" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, for example, due to manufacturing techniques and/or tolerances, modifications of the shape shown may be estimated. Thus, embodiments of the present inventive concept should not be construed as being limited to the particular shapes of regions shown herein, for example, to include a change in shape results in manufacturing. The following embodiments may also be constituted by one or a combination thereof.

The contents of the present inventive concept described below may have a variety of configurations and propose only a required configuration herein, but are not limited thereto.

Figure 2:
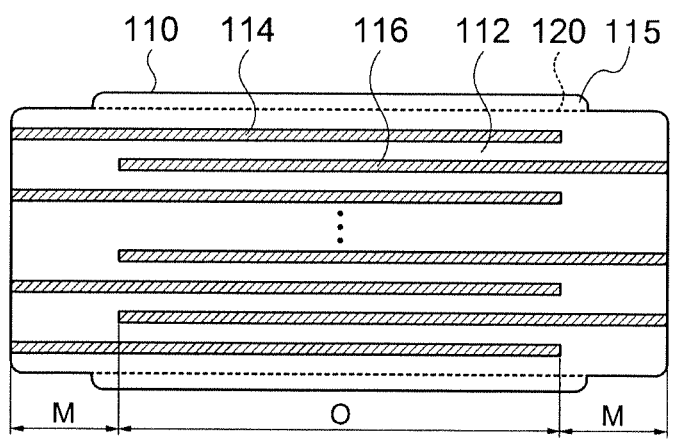
FIGS. 2 and 3 are cross-sectional views taken along line I-I' of FIG. 1 in order to illustrate a method of manufacturing a multilayer ceramic electronic component according to an exemplary embodiment in the present disclosure.
Figure 3:
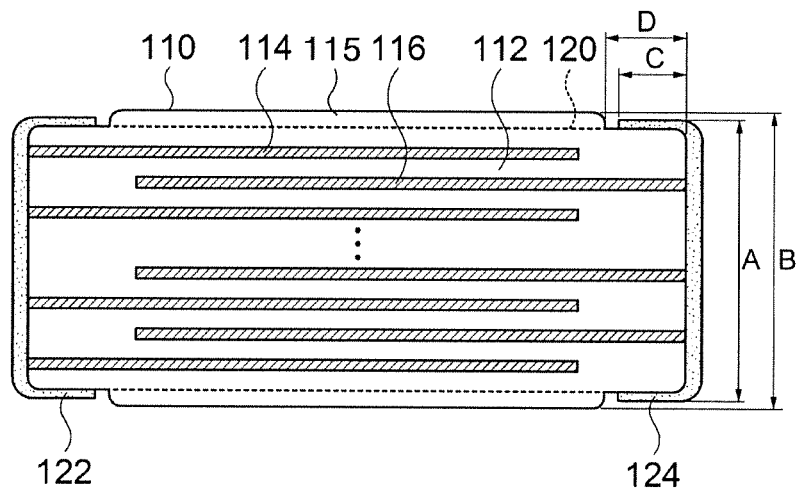
Figure 4:
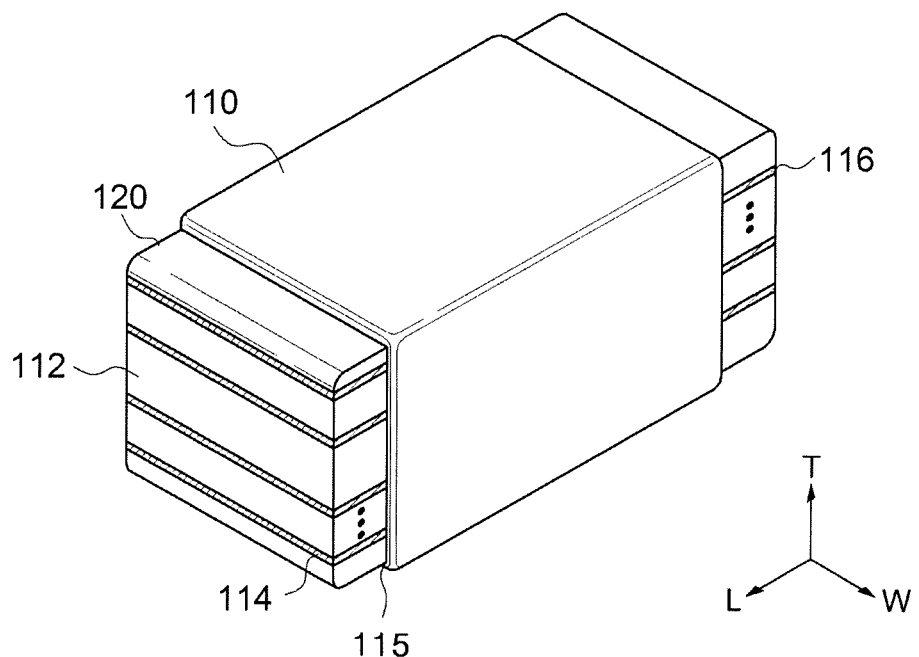
FIG. 4 is a schematic perspective view illustrating a ceramic body according to an exemplary embodiment in the present disclosure.

FIG. 1 is a schematic perspective view illustrating a multilayer ceramic electronic component according to an exemplary embodiment; FIGS. 2 and 3 are cross-sectional views taken along line I-I' of FIG. 1 in order to illustrate a method of manufacturing a multilayer ceramic electronic component according to an exemplary embodiment; and FIG. 4 is schematic perspective view illustrating a ceramic body according to an exemplary embodiment in the present disclosure.

Referring to FIGS. 1 through 3, the multilayer ceramic electronic component may include a ceramic body 110 including an electrode structure 120 including internal electrodes 114 and 116 stacked to face each other with respective dielectric layers 112 interposed therebetween and alternately exposed to opposite end surfaces thereof. Ceramic bands 115 may enclose regions spaced apart from both end surfaces of the electrode structure 120, and external electrodes 122 and 124 may cover opposite end surfaces of the electrode structure 120 and at least portions of surfaces of the electrode structure 120 connected to the end surfaces of the electrode structure 120, respectively. That is, each of the external electrodes 122 and 124 may cover a portion of each of the surfaces of the electrode structure 120 to have a length C shorter than a length D of each of the surfaces of the electrode structure 120 connected to both end surfaces of the electrode structure 120 so as to expose a portion of each of the surfaces of the electrode structure 120 connected to the end surfaces of the electrode structure 120 adjacent to the ceramic bands 115 in a length direction of the ceramic body.

Although a case in which the multilayer ceramic electronic component according to an exemplary embodiment is a multilayer ceramic capacitor will be described by way of example, the multilayer ceramic electronic component according to an exemplary embodiment is not limited thereto. The multilayer ceramic electronic component according to an exemplary embodiment may serve as another electronic component such as an inductor, a thermistor, or the like, by changing a structure of internal electrode layers.

In the multilayer ceramic capacitor according to an exemplary embodiment, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' may be the same as a 'stacking direction' of the plurality of internal electrodes 114 and 116.

The ceramic body 110 may have an overlap region O in which the internal electrodes 114 and 116 adjacent to each other overlap each other and margin regions M each disposed at both ends of the overlap region O.

The dielectric layers 112 may contain a material that may obtain sufficient capacitance. That is, the dielectric layers 112 may contain a ceramic material, but are not limited thereto. For example, the dielectric layers 112 according to an exemplary embodiment may contain ceramic powders, ceramic additives, organic solvents, plasticizers, binders, dispersants, or the like.

The internal electrodes 114 and 116 may be stacked to face each other with respective dielectric layers 112 interposed therebetween. The internal electrodes 114 and 116 may include a first internal electrode group including internal electrodes 114 of which distal ends are exposed to one of the end surfaces of the electrode structure 20 and a second internal electrode group including internal electrodes 116 of which distal ends are exposed to the other end surface of the electrode structure 20. The internal electrodes 114 and 116 may contain a conductive material. The conductive material may include one selected from the group consisting of silver (Ag), lead (Pb), platinum (Pt), nickel (Ni), copper (Cu), and a combination thereof. The internal electrodes 114 and 116 according to an exemplary embodiment may also contain nickel.

The margin regions M may be formed from both end surfaces of the electrode structure up to portions of regions in which the ceramic bands 115 are formed in the ceramic body 110. In addition, although not illustrated, the margin regions M may be formed in regions between both end surfaces of the electrode structure 120 and the ceramic bands.

The internal electrodes 114 and 116 may also be exposed to first and second surfaces of the electrode structure that are connected to the end surfaces of the electrode structure. Therefore, contact areas between the internal electrodes 114 and 116 and the external electrodes 122 and 124 may be increased.

The external electrodes 122 and 124 may include a first external electrode 122 electrically connected to the first internal electrode group including the internal electrodes 114 exposed to one of the end surfaces of the electrode structure 120 and a second external electrode 124 electrically connected to the second internal electrode group including the internal electrodes 116 exposed to the other end surface of the electrode structure 120. The external electrodes 122 and 124 may be used to easily mount the multilayer ceramic electronic component on an external board such as a printed circuit board (PCB), or the like.

Unlike as illustrated, the external electrodes 122 and 124 may cover both end surfaces of the electrode structure 120 and the entirety of the surfaces of the electrode structure 120 connected to both end surfaces of the electrode structure 120, respectively. That is, the external electrodes 122 and 124 may have the same length C as the length D of the surfaces of the electrode structure connected to both end surfaces of the electrode structure in a length direction of the ceramic body.

When a thickness direction refers to a stacking direction of the internal electrodes 114 and 116, the external electrodes 114 and 116 may have a thickness less than that of the ceramic body 110 (A<B) in the thickness direction. That is, a thickness A of the external electrodes 122 and 124 may be less than a thickness B of the ceramic body 110, in the T direction. Similarly, the external electrodes 122 and 124 may also have a width narrower than that of the ceramic body 110, in the W direction. Therefore, when the multilayer ceramic electronic component according to an exemplary embodiment is mounted on the external board such as the PCB, or the like, mounting reliability of the multilayer ceramic electronic component may be improved.

The multilayer ceramic electronic component according to an exemplary embodiment may include the external electrodes 122 and 124 having a height lower than or the same as that of surfaces of the ceramic body 110, unlike the multilayer ceramic electronic component according to the related art including external electrodes protruding from the surfaces of the ceramic body. Therefore, a case in which the external electrodes have a maximum height may be a case in which the external electrodes have the same height as that of the surfaces of the ceramic body, and since the multilayer ceramic electronic component in which the external electrodes have the same height as that of the surfaces of the ceramic body may include a larger number of stacked internal electrodes 112 and 114 as compared with the related art, high capacitance of the multilayer ceramic electronic component may be secured.

In addition, since the multilayer ceramic electronic component according to an exemplary embodiment includes the external electrodes 122 and 124 having a height that is lower than or the same as that of the surfaces of the ceramic body 110, in a case in which the multilayer ceramic electronic component is mounted on the external board, short circuits between the multilayer ceramic electronic component and a metal for preventing electromagnetic interference (EMI) or other electronic components adjacent to the multilayer ceramic electronic component may be prevented. Therefore, mounting reliability of the multilayer ceramic electronic component mounted on the external board may be improved.

The external electrodes 122 and 124 may be formed by an applying method or a plating method. The external electrodes 122 and 124 formed by the applying method may be formed of a conductive resin prepared by dispersing metal powders in a polymer resin. The metal powders may include one selected from the group consisting of silver, copper, palladium (Pd), platinum, and an alloy thereof. In addition, the external electrodes 122 and 124 formed by the plating method may be formed of a metal. The metal may include one selected from the group consisting of silver, copper, palladium, platinum, nickel, tin (Sn), and alloys thereof. However, materials of the external electrodes 122 and 124 are not limited thereto. That is, materials of the external electrodes 122 and 124 are not particularly limited as long as they provide conductivity.

The external electrodes 122 and 124 may be provided on both end surfaces of the electrode structure 120 and the surfaces of the electrode structure 120 connected to both end surfaces of the electrode structure 120, respectively, to provide different polarities to the multilayer ceramic electronic component. For example, the first external electrode 122 provided on one of the end surfaces of the electrode structure 120 may be electrically connected to the first internal electrode group exposed to the end surface of the electrode structure 120 to provide a positive (+) or negative (−) polarity to the first internal electrode group, and the second external electrode 124 provided on the other end surface of the electrode structure 120 may be electrically connected to the second internal electrode group exposed to the other end surface of the electrode structure 120 to provide a polarity opposite to the polarity provided by the first external electrode 122 to the second internal electrode group.

As set forth above, according to exemplary embodiments, the multilayer ceramic electronic component may include the ceramic body including an electrode structure including internal electrodes stacked to face each other with respective dielectric layers interposed therebetween and alternately exposed to the end surfaces thereof, the ceramic bands enclosing the regions spaced apart from both end surfaces of the electrode structure, and the external electrodes covering both end surfaces of the electrode structure and at least portions of the surfaces of the electrode structure connected to both end surfaces of the electrode structure, respectively, such that a capacitance of the multilayer ceramic electronic component having the same maximum height may be increased and mounting reliability of the multilayer ceramic electronic component may be improved. Therefore, a method of manufacturing a multilayer ceramic capacitor of which capacitance may be increased and mounting reliability may be improved may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   a ceramic body including an electrode structure including internal electrodes stacked to face each other with respective dielectric layers interposed therebetween and alternately exposed to first and second end surfaces thereof and ceramic bands enclosing regions spaced apart from the first and second end surfaces of the electrode structure; and
   external electrodes spaced apart from the ceramic band and covering the first and second end surfaces of the electrode structure and at least portions of surfaces of the electrode structure connected to the first and second end surfaces of the electrode structure, respectively,
   wherein when a thickness direction refers to a stacking direction of the internal electrodes, the external electrodes have a thickness less than that of the ceramic body in the thickness direction.

2. The multilayer ceramic electronic component of claim 1, wherein when a width direction refers to a direction perpendicular to both of a stacking direction of the internal electrodes and a length direction, the external electrodes have a width narrower than that of the ceramic body in the width direction.

3. The multilayer ceramic electronic component of claim 1, wherein the external electrodes cover an entirety of the surfaces of the electrode structure connected to the first and second end surfaces of the electrode structure.

4. The multilayer ceramic electronic component of claim 1, wherein the ceramic body has an overlap region in which the internal electrodes adjacent to each other in an exposed direction of the internal electrodes overlap each other and margin regions formed at both ends of the overlap region, and the margin regions are formed in regions between the first and second end surfaces of the electrode structure and the ceramic bands in the ceramic body.

5. The multilayer ceramic electronic component of claim 1, wherein the ceramic body has an overlap region in which the internal electrodes adjacent to each other in an exposed direction of the internal electrodes overlap each other and margin regions formed at both ends of the overlap region, and the margin regions are formed from the first and second end surfaces of the electrode structure and include portions of regions in which the ceramic bands are formed in the ceramic body.

6. The multilayer ceramic electronic component of claim 1, wherein the internal electrodes are exposed to first and second surfaces of the electrode structure connected to the first and second end surfaces of the electrode structure.

7. The multilayer ceramic electronic component of claim 1, wherein C<D, where C is a length of the extent of the external electrode along an upper surface of the electrode structure and D is a distance between the end surface of the electrode structure and the ceramic band.

8. A method of manufacturing a multilayer ceramic electronic component, comprising steps of:

preparing a ceramic body including an electrode structure including internal electrodes stacked to face each other with respective dielectric layers interposed therebetween and alternately exposed to first and second end surfaces thereof and ceramic bands enclosing regions spaced apart from the first and second end surfaces of the electrode structure; and forming external electrodes spaced apart from the ceramic band and covering the first and second end surfaces of the electrode structure and at least portions of surfaces of the electrode structure connected to the first and second end surfaces of the electrode structure, respectively, wherein when a thickness direction refers to a stacking direction of the internal electrodes, the external electrodes have a thickness less than that of the ceramic body in the thickness direction.

9. The method of claim 8, wherein when a width direction refers to a direction perpendicular to both of a stacking direction of the internal electrodes and a length direction, the external electrodes have a width narrower than that of the ceramic body in the width direction.

10. The method of claim 8, wherein the external electrodes cover the entirety of the surfaces of the electrode structure connected to the first and second end surfaces of the electrode structure.

11. The method of claim 8, wherein in the step of forming the external electrodes, an applying method or a plating method is used.

12. The method of claim 8, wherein the ceramic body has an overlap region in which the internal electrodes adjacent to each other in an exposed direction of the internal electrodes overlap each other and margin regions formed at both ends of the overlap region, and the margin regions are formed in regions between the first and second end surfaces of the electrode structure and the ceramic bands in the ceramic body.

13. The method of claim 8, wherein the ceramic body has an overlap region in which the internal electrodes adjacent to each other in an exposed direction of the internal electrodes overlap each other and margin regions formed at both ends of the overlap region, and the margin regions are formed from the first and second end surfaces of the electrode structure and include portions of regions in which the ceramic bands are formed in the ceramic body.

14. The method of claim 8, wherein the internal electrodes are exposed to first and second surfaces of the electrode structure connected to the first and second end surfaces of the electrode structure.

15. The method of claim 8, wherein C<D, where C is a length of the extent of the external electrode along an upper surface of the electrode structure and D is a distance between the end surface of the electrode structure and the ceramic band.

* * * * *